United States Patent

Yates et al.

[15] 3,641,434

[45] Feb. 8, 1972

[54] WIDE-BAND CRYSTAL-CONTROLLED TRANSCEIVER WITH REMOTE DIGITAL TUNING

[72] Inventors: Lester R. Yates, Lighthouse Point, Fla.; Charles M. Dorsey, Jr., Baltimore; John B. Howell, Sparks; Winfred S. Conklin, Baltimore, all of Md.; Joseph J. Sawicki; Reeves T. Shepherd, both of Pompano Beach, Fla.; Silvio Soares, Baltimore, Md.

[73] Assignee: The Bendix Corporation

[22] Filed: Oct. 10, 1968

[21] Appl. No.: 766,435

[52] U.S. Cl...................................325/17, 325/25, 325/184, 325/421, 331/19, 331/40

[51] Int. Cl...........................................H04b 1/40, H04b 3/08

[58] Field of Search..................325/17, 18, 20, 25, 421, 183, 325/184; 331/2, 4, 19, 25, 40; 328/134

[56] References Cited

UNITED STATES PATENTS

| | | | |
|---|---|---|---|
| 3,153,194 | 10/1964 | Orwin et al. | 325/20 |
| 3,379,993 | 4/1968 | Berman | 331/4 |
| 3,512,103 | 5/1970 | Berman | 331/19 |

*Primary Examiner*—Benedict V. Safourek
*Attorney*—Plante, Arens, Hartz & O'Brien, Bruce L. Lamb and William G. Christoforo

[57] ABSTRACT

A wide-band VHF crystal-stabilized transceiver remotely controlled by digital logic means. The transceiver incorporates a frequency synthesizer having a spectrum generator and a variable frequency oscillator phase locked to a selected component of the spectrum generator output. The particular component to which the oscillator is locked is selected by the digital logic which includes a translator for the ARINC 2×5 code enabling the use of decimal control switches.

8 Claims, 7 Drawing Figures

W. S. CONKLIN
C. M. DORSEY
J. B. HOWELL
J. J. SAWICKI
R. T. SHEPHERD
S. SOARES
L. R. YATES
INVENTORS

BY

Bruce L. Lamb

ATTORNEY

WINFRED S. CONKLIN
CHARLES M. DORSEY
JOHN B. HOWELL
JOSEPH J. SAWICKI
REEVES T. SHEPHERD
SILVIO SOARES
LESTER R. YATES
INVENTORS

BY

ATTORNEY

| CLOCK | J=P' | K=N | M | J=M | K=M' | N | J=N | K=N' | P | M' | |
|---|---|---|---|---|---|---|---|---|---|---|---|
| RESET | | | 0 | | | 0 | | | 1 | 1 | |
| 1 | 0 | 0 | 0 | 0 | 1 | 0 | 0 | 1 | 0 | 1 | |
| 2 | 1 | 0 | 1 | 0 | 1 | 0 | 0 | 1 | 0 | 0 | * |
| 3 | 1 | 0 | 1 | 1 | 0 | 1 | 0 | 1 | 0 | 0 | |
| 4 | 1 | 1 | 0 | 1 | 0 | 1 | 1 | 0 | 1 | 1 | |
| 5 | 0 | 1 | 0 | 0 | 1 | 0 | 1 | 0 | 1 | 1 | |
| 6 | 0 | 0 | 0 | 0 | 1 | 0 | 0 | 1 | 0 | 1 | |
| 7 | 1 | 0 | 1 | 0 | 1 | 0 | 0 | 1 | 0 | 0 | * |
| 8 | 1 | 0 | 1 | 1 | 0 | 1 | 0 | 1 | 0 | 0 | |
| 9 | 1 | 1 | 0 | 1 | 0 | 1 | 1 | 0 | 1 | 1 | |
| 10 | 0 | 1 | 0 | 0 | 1 | 0 | 1 | 0 | 1 | 1 | |
| 11 | 0 | 0 | 0 | 0 | 1 | 0 | 0 | 1 | 0 | 1 | |
| 12 | 1 | 0 | 1 | 0 | 1 | 0 | 0 | 1 | 0 | 0 | * |

WIDE-BAND CRYSTAL-CONTROLLED TRANSCEIVER WITH REMOTE DIGITAL TUNING

The present invention relates to radio transmitter-receivers. More particularly it relates to radio transceivers designed for aircraft communications uses featuring crystal control on any channel selected from amongst a plurality of channels in the VHF operating band and a digital logic tuning system adapted to remote control.

Space limitations in aircraft cockpits demand, within the present state of the art, that auxiliary aircraft equipment be remotely controllable from a control head that occupies the least practical amount of volume. U.S. Pat. 2,902,596 to Rockwell et al. discloses an electromechanical system for remotely tuning an aircraft transceiver. An improved, entirely electronic tuning system is described in the pending U.S. patent application of Yates et al., Ser No. 452,514 now U.S. Pat No. 3,413,554. In the Yates et al. system, diode switching matrices select combinations of crystals for tuning the receiver. The switching matrices are controlled remotely by grounding pairs of wires in accordance with the ARINC 2 out of 5 format. During transmission, a voltage-controlled master oscillator is swept through the frequency band until its frequency approaches the frequency to which the receiver is tuned. The frequency sweep is then halted and control of the master oscillator is transferred to the receiver output. Thus the crystals controlling the receiver frequency also monitor and control the transmitter frequency, imparting thereto the same accuracy and stability as is inherent in the crystals.

Although the Yates et al. system afforded many advantages over prior electromechanically tuned systems it did not permit a significant reduction in the number of precision-ground crystals required. Also the transmitter employed current variable inductors as frequency control components for vacuum tube master oscillator and power amplifier stages. In addition to the obviously lower efficiency of vacuum tube stages compared to semiconductor stages, current variable inductors are rather critical components which are costly to produce within the required stability limits.

An object of the present invention is to construct a VHF transceiver capable of performance equal or superior in all respects to the transceiver described by Yates et al. In this context performance includes not only the usual criteria of power output, frequency stability, freedom from spurious outputs, and the like but also reliability, efficiency, and ease of maintenance.

The present invention employs a frequency synthesizer which is remotely controlled by digital logic circuits to generate any selected frequency in steps of 25 kHz. throughout an operating band of 116–152 mHz. The synthesizer requires only a single, highly accurate crystal oscillator which generates spectrum components at 0.2 mHz. spacing over the entire band. A second crystal oscillator using eight selectable crystals subdivides the 0.2 mHz. intervals of the first crystal oscillator into the desired 25 kHz. channel spacings. Thus the present invention accomplishes with nine crystals a function requiring 47 or more crystals in the prior Yates et al. system. Furthermore, in the present invention only one of the nine crystals need have a frequency tolerance of 0.001 percent in order to produce that degree of accuracy in the output, whereas prior systems required at least 33 precise crystals to provide similar accuracy throughout an equal band.

Another object of the invention is therefore to provide a crystal controlled VHF transceiver tunable through a wide band using substantially fewer crystals than prior transceivers.

Another object of the invention is to provide a frequency synthesizer which is readily adapted to frequency modulation so that the transceiver is capable of cooperating with an artificial satellite for extremely long range communications.

Briefly, the present invention comprises a remotely controlled frequency synthesizer producing an output at the desired carrier frequency which then may be amplified, modulated and radiated for transmission of a message. For reception, the same synthesizer serves as the first local oscillator of the receiver. The transmitter stages are sufficiently broadbanded that no tuning adjustments are required. The receiver employs a voltage tuned preselector, which is controlled by the synthesizer, to cover the entire band with a high degree of selectivity. Thus tuning of the transmitter and receiver are accomplished by the remote control of the synthesizer.

The synthesizer includes a spectrum generator which produces precise frequency components spaced at 0.2 mHz. throughout the band. The output of a voltage controlled oscillator (VCO) is mixed with this spectrum to produce an intermediate frequency. As the frequency of the VCO is swept upward from a known reference frequency, the coincidence of the VCO frequency with each of the 0.2 mHz. spaced components produces a brief burst of IF signal from the mixer. These bursts are shaped into pulses and counted until the total accumulated is equal to a number predetermined by the remotely controlled digital logic. The VCO sweep is then halted and its frequency is closely controlled by a phase locked loop. In a simplified example, if the known reference frequency were 110 mHz. and the desired frequency were 115 mHz., the VCO sweep would be arrested at the count of 25 and the VCO would be phase locked to the 115 mHz. component of the spectrum generator. The phase locked VCO is a very precise means of selecting a single desired frequency component from the broad spectrum. The output of the VCO is the synthesizer output, which may be the transmitter carrier frequency or the receiver first local oscillator frequency, depending upon the mode of operation.

Figure 2:
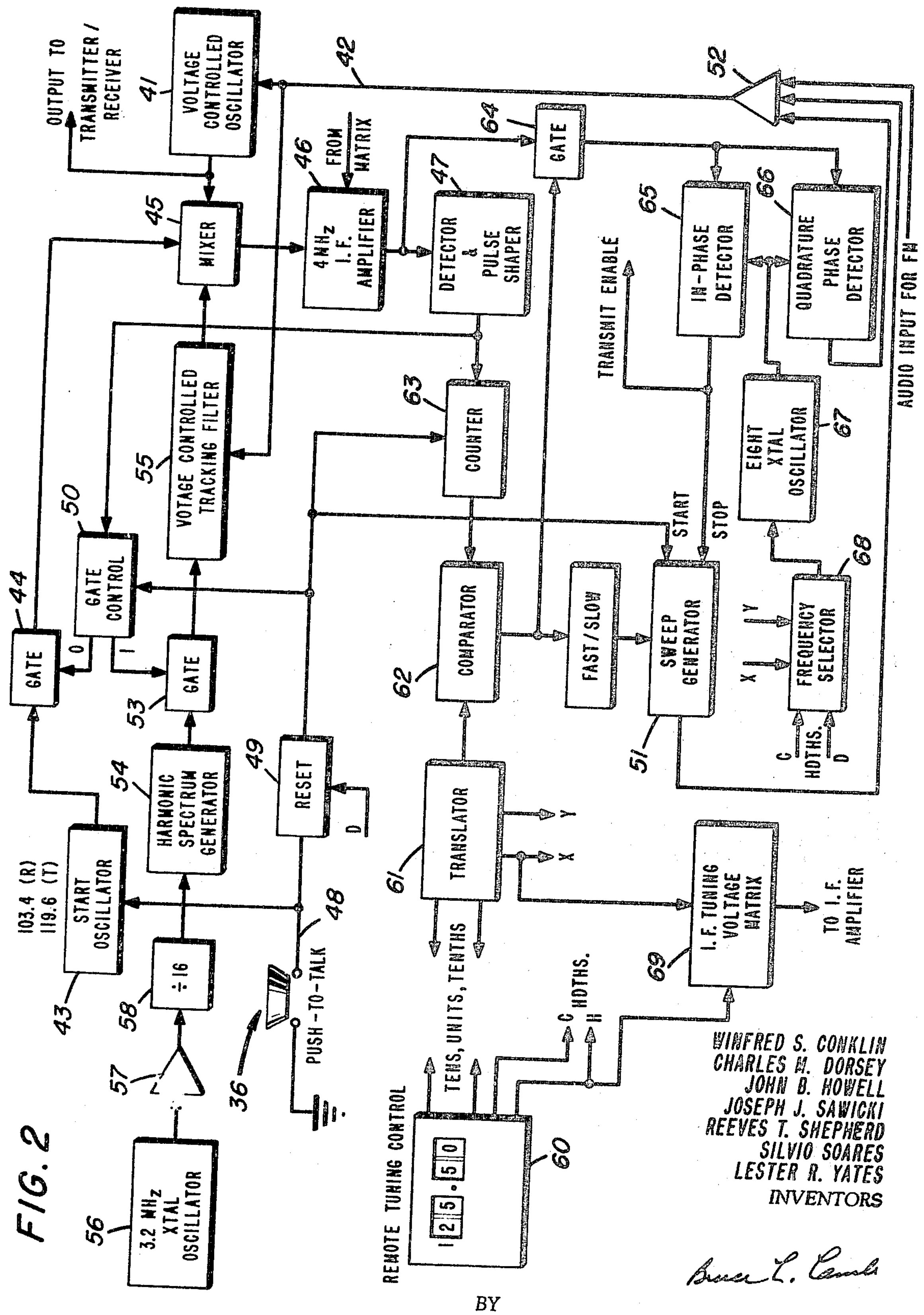
FIG. 2 is a functional block diagram of the frequency synthesizer used in the invention.
Figure 3A:
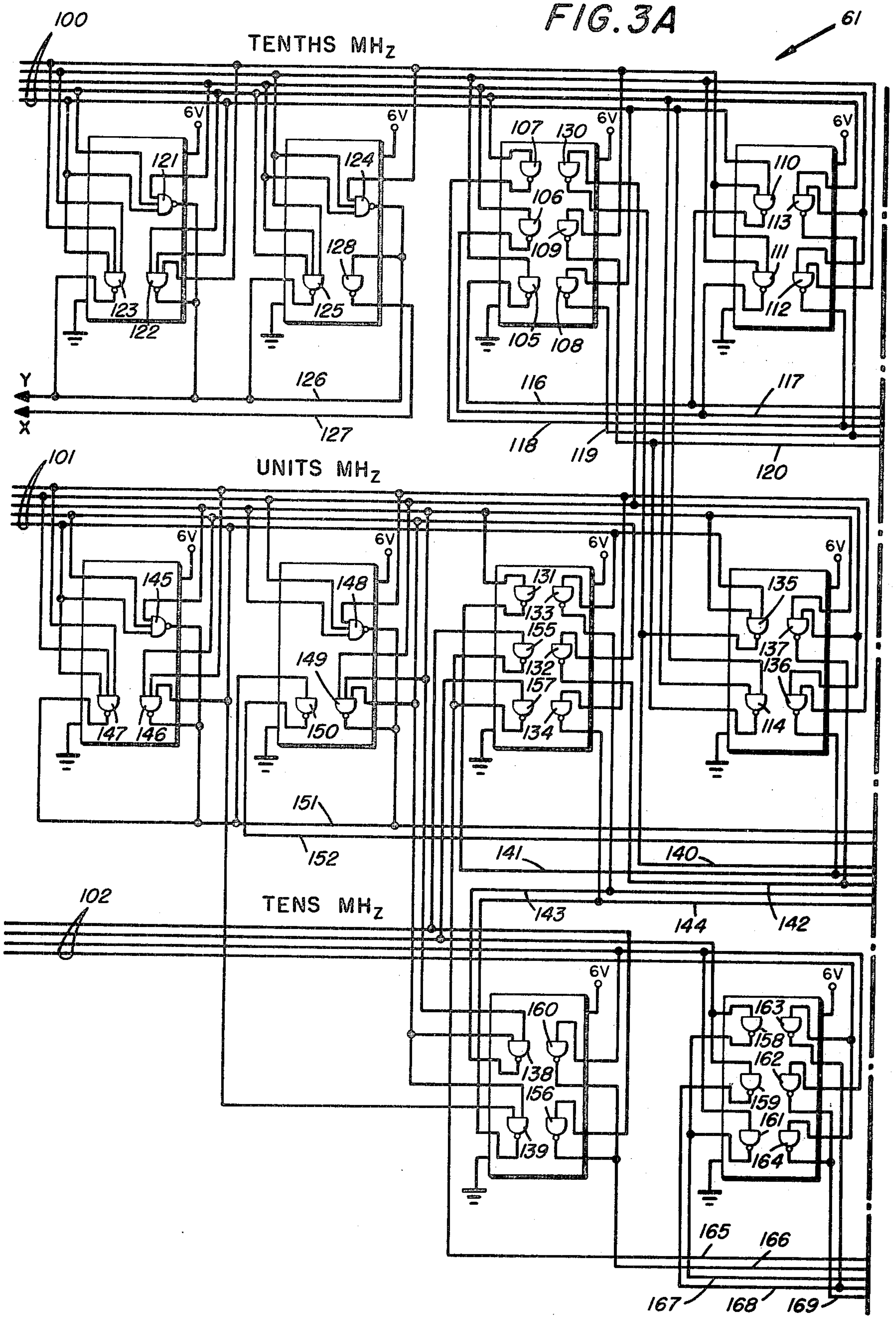
Figure 3B:
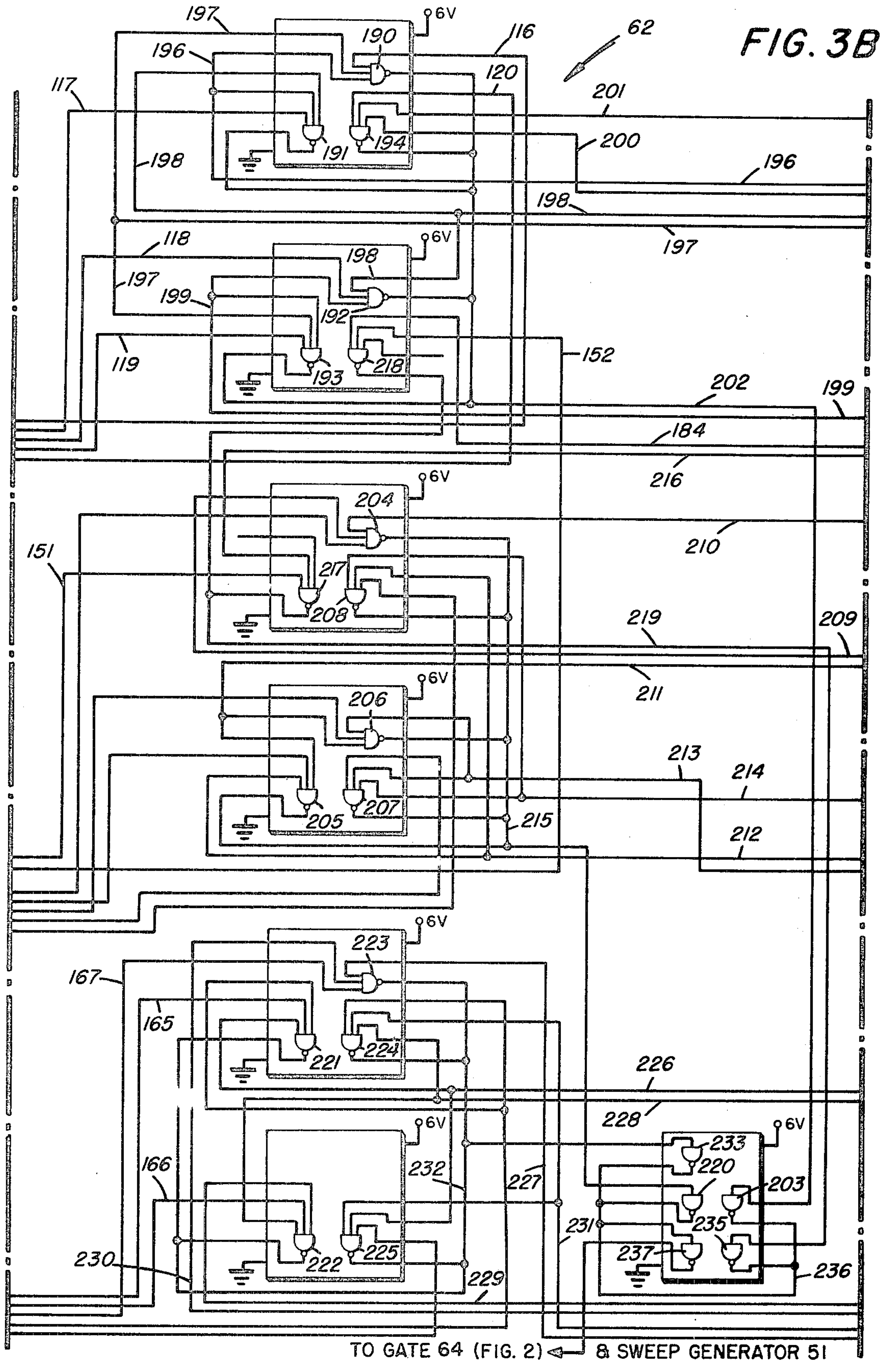
Figure 3C:
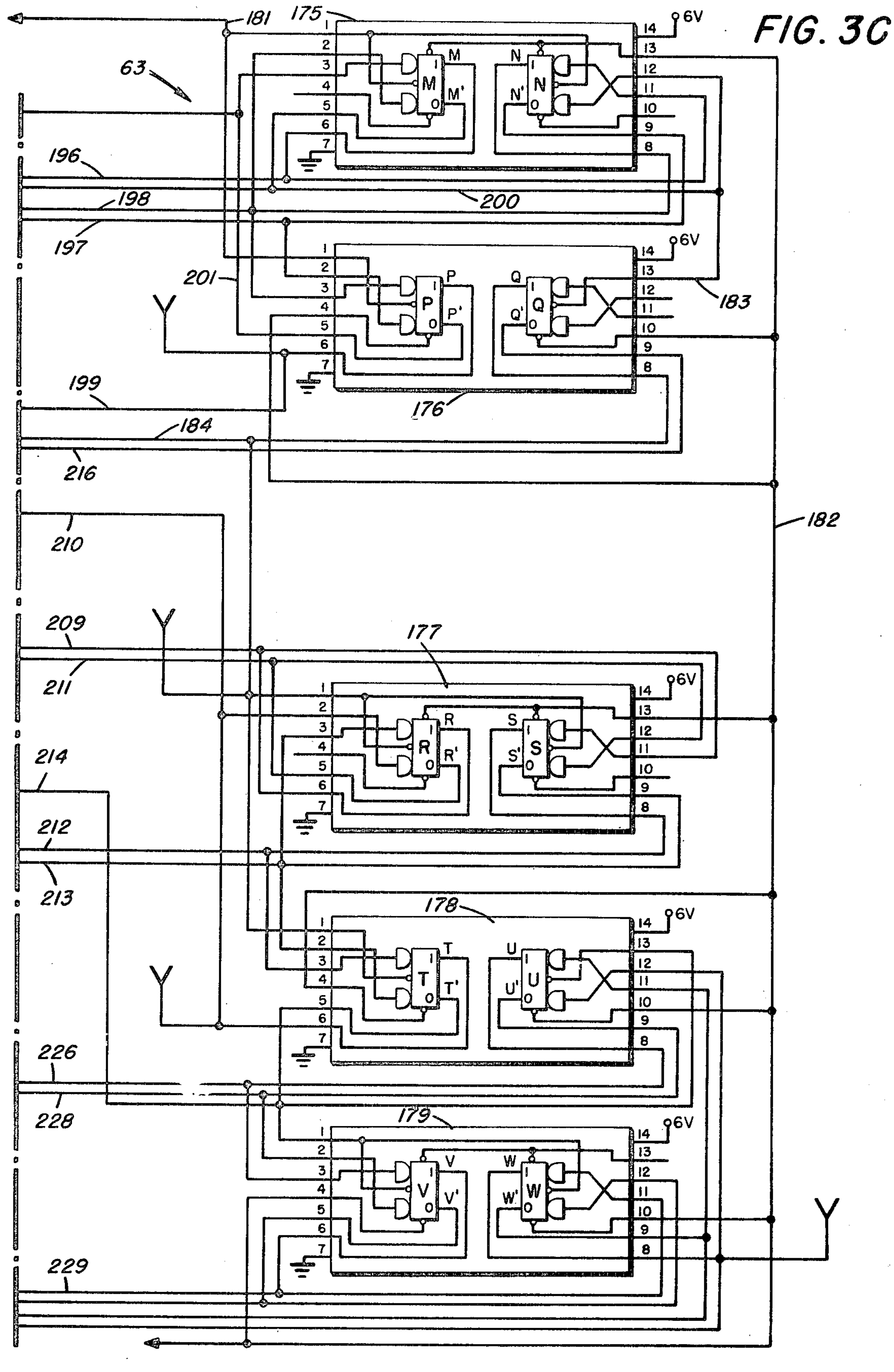
Figure 4:
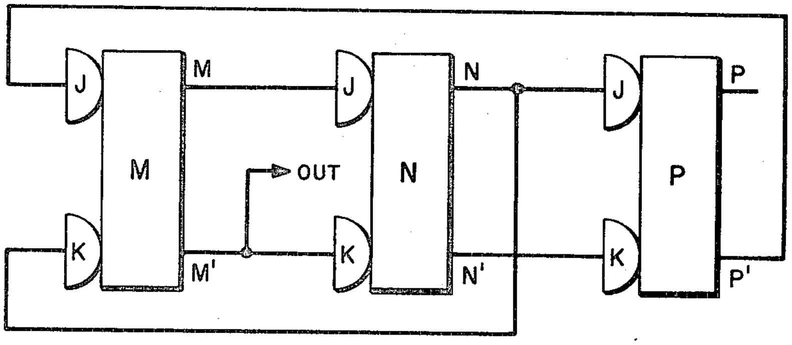
Figure 5:
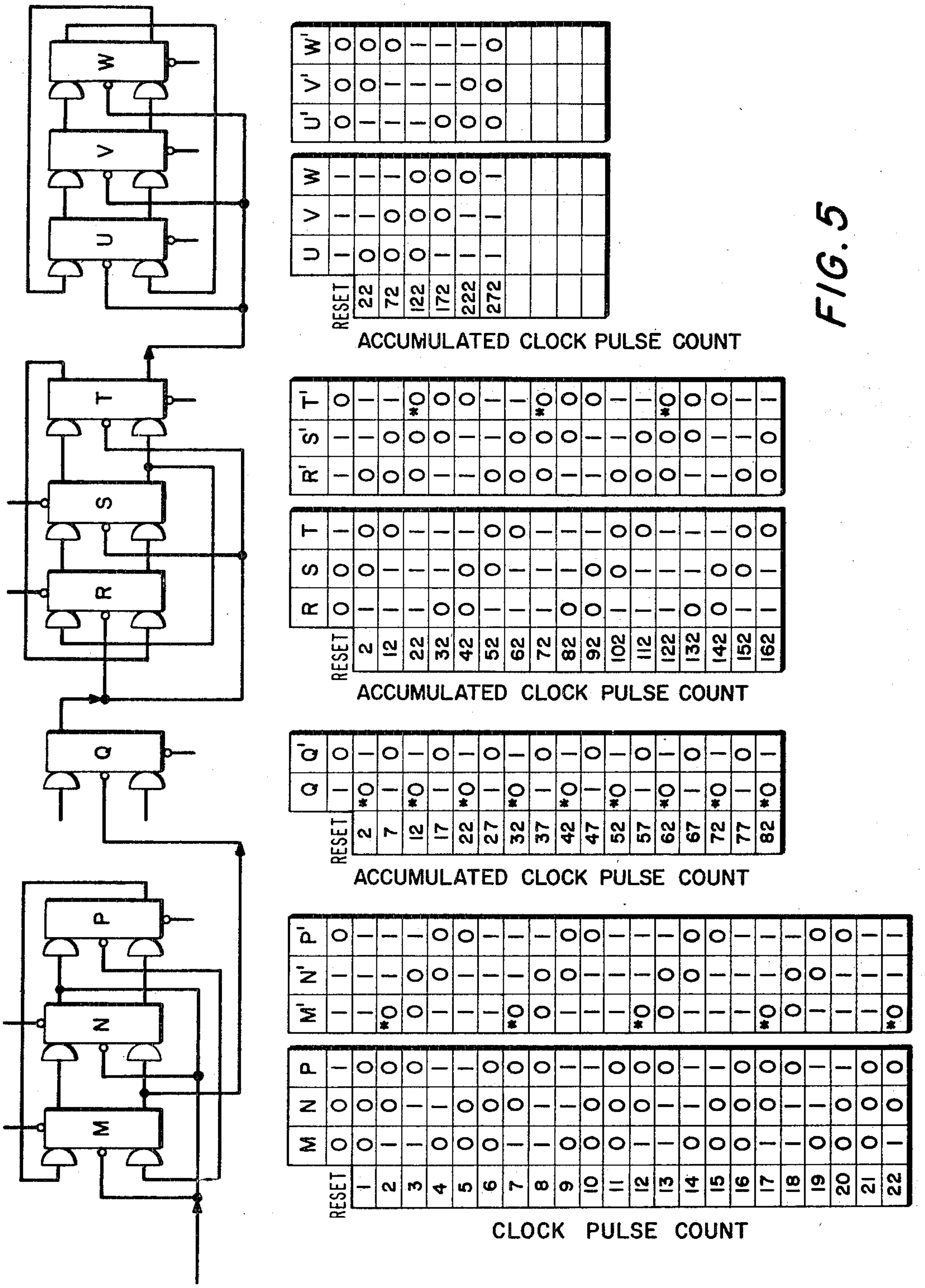

FIGS. 3A, 3B, and 3C, assembled in order, are block diagrams showing details of the translator, comparator and counter circuits providing remote digital control of the synthesizer of FIG. 2;

FIG. 4 is a truth table useful in explaining the operation of one of the counter circuits of FIG. 3C; and FIG. 5 is an expanded truth table useful in explaining the operation of the complete counter of FIG. 3C.

Figure 1:
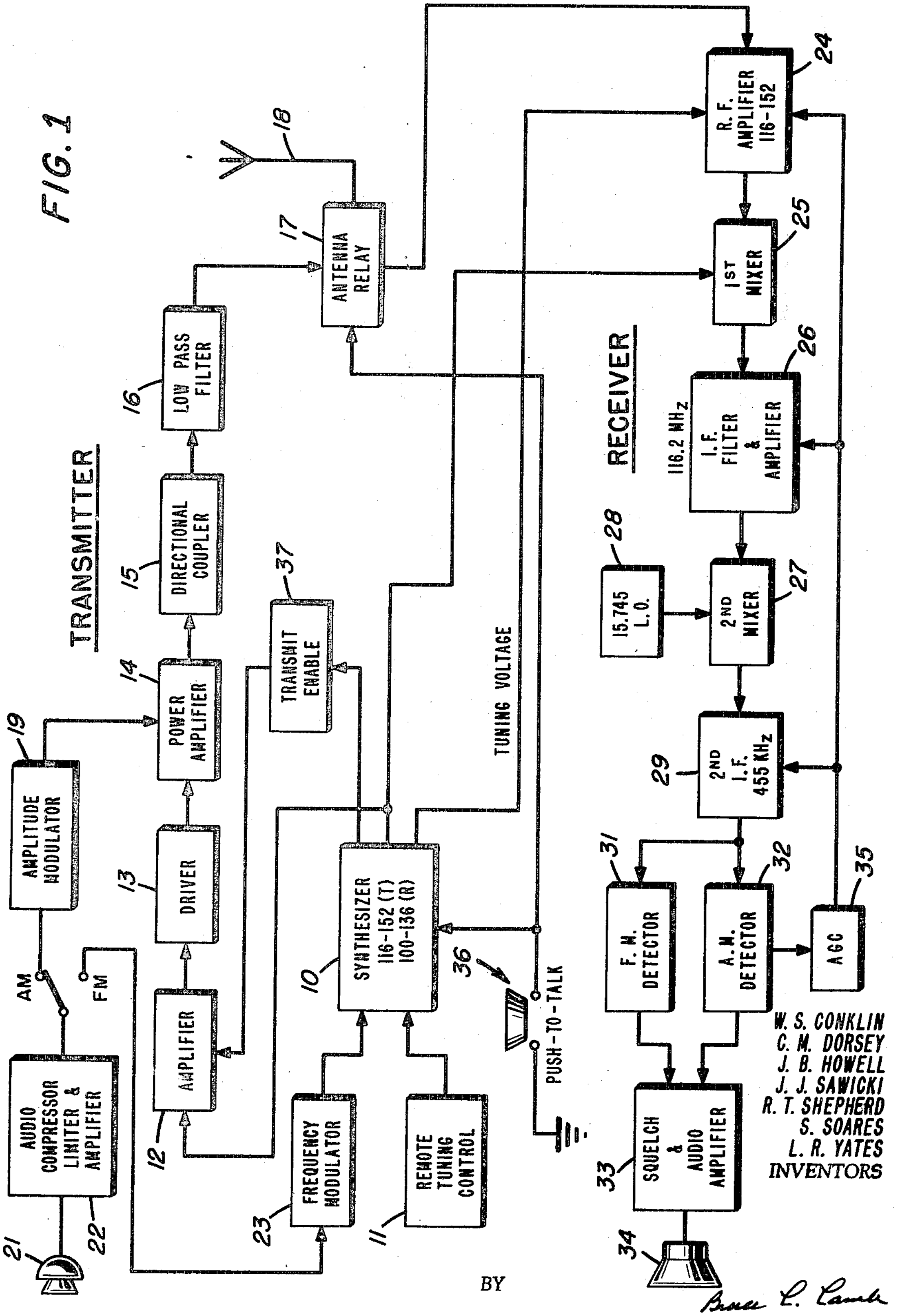
FIG. 1 is a functional block diagram of the transceiver of the invention.

Referring to the transmitter portion of FIG. 1, a frequency synthesizer 10 generates a selected frequency in the VHF band, as determined by a remote tuning control 11. The output of the synthesizer is applied through amplifier 12, driver 13, power amplifier 14, directional coupler 15, low pass filter 16 and antenna relay 17 to provide carrier signal for radiation by an antenna 18. The carrier may be amplitude modulated by a pulse width type modulator 19 which varies the voltage supplied by the power source to power amplifier 14 in accordance with an audio signal originating at a microphone 21. As is usual in communications equipment, an audio compressor, limiter and amplifier 22 process the audio signal prior to its use for modulation. If the transmitted signal is to be frequency modulated rather than amplitude modulated, the processed audio signal is applied through a modulator 23 to frequency modulate the output signal of synthesizer 10.

In reception, the antenna 18 is disconnected from filter 16 and connected to the input of an electronically tuned radiofrequency amplifier 24 for preselection. Signals passed by amplifier 24 appear in a first mixer 25 where they are combined with the output of synthesizer 10. The first intermediate frequency amplifier 26 may suitably be tuned to 16.2 mHz. The output frequency of the synthesizer must differ from the frequency of the selected signal an amount equal to the first IF, consequently, during reception, the synthesizer output frequency shifts to a value 16.2 mHz. lower than the value produced during transmission. In addition to supplying the first injection frequency to mixer 25, the synthesizer supplies amplifier 24 with a direct tuning voltage of a value dependent upon the frequency of the selected channel.

A second mixer 27 and a second local oscillator operating at 15.745 mHz. reduce the first IF signal to the second intermediate frequency of 455 kHz. The second IF signal is amplified in an amplifier 29 and demodulated either in an FM detector 31 or an AM detector 32, according to the mode of operation selected. Thereafter the audio signal passes through squelch and amplifier circuits 33 to an output transducer 34. Automatic Gain Control (AGC) is derived from the AM detector 32 by an amplifier 35, the output of which controls the gain of RF amplifier 24 and IF amplifiers 26 and 29.

Operation in the transmit or receive mode is controlled by a push-to-talk switch 36. When this switch is closed, as it would be during transmission, the antenna relay 17 transfers the connection of the antenna 18 from the input to amplifier 24 to the output of filter 16. Simultaneously the synthesizer 10 is reset to a frequency lower than the lowest available frequency in the band. The synthesizer then sweeps upward in frequency until the frequency of the selected channel is reached. At that time a signal is given to a transmitenable circuit 37 which then supplies power to amplifier 12, enabling the transmitter carrier to be radiated. The changeover from the receive to the transmit mode occurs so rapidly that no hesitance is required by the operator between closing switch 36 and beginning a vocal message. It will be recalled from the brief description previously given that the synthesizer includes a voltage controlled oscillator, the frequency of which is swept upwards from a known reference frequency approximately to the value of the selected frequency. Thereafter the frequency is closely controlled by a phase locked loop. The sweep function may be initiated by any of the following events; upon the first application of power; upon changing the channel selection; and upon changing from receive to transmit and vice versa.

Referring to FIG. 2, the VCO 41 produces an output frequency determined by the voltage on control line 42. Initially the control voltage is at a level causing the VCO frequency to be below the lowest frequency in the operating band. A start oscillator 43 provides the known reference whence measurement of the VCO frequency commences. The start oscillator output passes an initially open gate circuit 44 to a mixer 45 where it is combined with the output of VCO 41. The difference frequency output of mixer 45 is applied to an IF amplifier 46 nominally tuned to a frequency of 4 mHz. It will later be clear that amplifier 46 is actually step tuned through a narrow range according to the frequency of the selected channel. For the present, amplifier 46 can be considered to be tuned to a narrow band of frequencies centered at 4 mHz. The output of amplifier 46 is detected and shaped into pulses by circuit 47, the output of which serves as frequency markers for the VCO 41 in a manner next to be described.

Assuming the push-to-talk switch 36 to be closed, the grounding of line 48 will cause the frequency of the start oscillator 43 to be set at 119.6 mHz. A reset single-shot multivibrator 49 is also actuated which resets a gate control single-shot 50 to the "0" state, thereby enabling gate 44. Simultaneously reset circuit 49 starts the operation of a sweep generator 51 which produces a saw tooth waveform output. The sweep generator output appears, after amplification in an amplifier 52, on control lead 42. Amplifier 52 may have a nonlinear transfer characteristic to compensate for the nonlinearity of the circuits tuned by the voltage on lead 42.

The output of the sweep generator starts at a value causing the frequency of VCO 41 to be below 116 mHz., the lowest frequency in the operating band. As the value of the sweep output increases, the VCO frequency follows. When the VCO frequency reaches 115.6 mHz., signal at 4 mHz. appears at the output of amplifier 46 which is detected and shaped into a single pulse by the detector and pulse shaper 47. This pulse triggers the gate control multivibrator 50 from the "0" to the "1" state, inhibiting gate circuit 44 and enabling a gate circuit 53. Gate 53 controls the conduction of output from a harmonic spectrum generator 54 through a voltage controlled tracking filter 55 to mixer 45.

A crystal-controlled oscillator 56 operating at the precise frequency of 3.2 mHz. provides a signal which is amplified at 57 and divided by 16 in a binary-type divider 58 to provide an output signal at a precise frequency of 0.2 mHz. The 0.2 mHz. output of divider 58 is shaped into a waveform rich in all orders of harmonics, i.e., both odd and even, by the spectrum generator 54. The tracking filter 55 is electronically tuned by the voltage on control lead 42 through a band of frequencies displaced from the frequency of VCO 41 by 4 mHz., the frequency of IF amplifier 46. When the VCO frequency reaches 115.6 mHz. and gate 53 is enabled, filter 55 will be tuned to pass those frequency components in the output of generator 54 which are centered about 119.6 mHz. Thus as the VCO frequency continues to increase under the control of sweep generator 51 each harmonic component encountered in mixer 45 produces a pulse at the output of detector and pulse shaper 47. For example, when gate 53 is first enabled, the frequency components passed by filter 55 include 119.2; 119.4; 119.6; 119.8; 120.0 mHz., but no component which is not an integral multiple of 0.2 mHz. will be present. When the VCO frequency reaches 115.8 mHz., a second pulse will be produced by the combination of the VCO frequency with the 119.8 mHz. harmonic component, and at 116.0, the third pulse appears by combination with the 120.0 mHz. component, and so on. The frequency of the VCO is known at any time within 0.2 mHz. by counting the number of pulses produced after the VCO reached the reference frequency, multiplying the pulse count by 0.2 mHz. and adding the result to the reference frequency. Tuning of the synthesizer is controlled by digital logic circuits which accomplish this process.

The frequency of the channel selected for transceiver operation is dialed on a remote tuning control 60. This control comprises a series of multiposition switches each with a number of positions equal to the number of variable integers in the tuning band. For example, in the 116.000–152.000 mHz. band, the hundreds mHz. is a constant equal to one, requiring no variable control position. The tens mHz. is variable through the range of 1–5, requiring a five position switch. Units and tenths mHz. vary through the range of 0–9, each requiring a ten position switch, while the hundredths mHz. selection, for 25 mHz. channel spacing, requires only a four position switch.

Each switch of group 60 is connected to a translator circuit 61 by separate groups of wires of adequate number to provide uniquely paired wire combinations for each switch position. The tens mHz. switch requires four wires, units and tenths mHz., five wires each and hundredths mHz., two wires. The translator circuit 61, later to be described in detail, contains logic elements for translating the pairs of wires grounded by control 60 into unique logical statements equivalent to the numerical identity of the selected channel. A comparator 62 receives the logical statements of translator 61 and continuously tests the truth of such statements against the output of a counter 63. Upon detection of truth, or coincidence, between the statement of translator 61 and the output of counter 63, the comparator 62 signals the completion of the initial tuning phase of the synthesizer by switching sweep generator 51 from fast to slow and by enabling a gate 64. Gate 64 conducts the output of IF amplifier 46 to an inphase phase detector 65. When the slow sweep has raised the output of detector 65 above a threshold level, the sweep is stopped. Thereafter adjustment in the VCO frequency necessary to maintain its output precisely on the selected channel frequency is provided by combining in amplifier 52 the error signal output from a quadrature detector 66 with the sweep output being maintained constant by generator 51.

Phase detectors 65 and 66 both receive as reference frequency inputs the output of a crystal oscillator 67. Oscillator 67 operates at one of eight frequencies spaced 25 kHz. apart, determined by a frequency selector circuit 68. This circuit may simply comprise a diode switching matrix which is controlled by inputs from the hundredths mHz switch in control 60 and the X–Y function (tenths mHz. even or odd) from translator 61. Depending upon the combination of inputs to selector 68, one of eight crystals in the frequency range of 4.000 to 3.825 mHz. will be selected for operation in oscillator 67. For example, if control 60 is set to a value XXX.000 mHz., a 4.000 mHz. crystal will be switched into oscillator 67. If the control is set at XXX.025 mHz., a 3.975 mHz. crystal is selected, etc., allowing the 0.2 mHz. intervals between spectrum components from generator 54 to be subdivided into eight channels spaced 25 kHz. apart. As a further example, if control 60 is set to a frequency of 118.050 mHz., gate 64 will become enabled when the VCO frequency passes 117.8 mHz. The sweep will not be stopped at that point, however, but will continue to increase at a slow rate. The sweep will continue to increase the VCO frequency, reducing the difference between the VCO frequency and the 122.0 mHz. component of the spectrum generator until a value of 3.950 mHz. is approached. At this point an appreciable output will appear from phase detector 65 which will be conducted by gate 64 to stop and hold the output of sweep generator 51. The output frequency of IF amplifier 46 is then sufficiently close to the 3.950 mHz. reference frequency of oscillator 67 that the quadrature phase detector 66 will pull in and hold the VCO frequency to 118.050 to maintain the IF frequency precisely at 3.950 mHz.

From the foregoing it will be seen that the 4 mHz. given as the nominal frequency of IF amplifier 46 actually comprises the eight discrete frequencies in the band of 4.000 mHz. to 3.825 mHz. corresponding to the crystal frequencies of oscillator 67. Performance is improved by tuning amplifier 46 close to the intermediate frequency which actually prevails when the system is stabilized. For this purpose a diode switch matrix 69, controlled by the hundredths mHz. selector of tuning control 60 and the X function output of translator 61, selects one of four voltage levels available from a voltage divider for application to voltage variable capacitors in the tuned circuits of amplifier 46. Amplifier 46 is thereby tuned through four 50 kHz. steps, each of which will accommodate two adjacent frequencies in the band of 4.000–3.825 mHz.

The preceding describes the operation of the synthesizer in the transmit mode. During reception, tuning of the synthesizer is basically the same except that the reference frequency output of start oscillator 43 is reduced in frequency to 103.4 mHz. This will cause the stabilized output frequency of the synthesizer to be 16.2 mHz. below the frequency shown on the tuning control 60 thereby providing the proper injection frequency the first mixer 25 for reception of signals of the indicated frequency.

Tuning of the synthesizer for reception occurs whenever the push-to-talk switch 36 is open. With the ground removed from lead 48, a crystal of 103.4 mHz. frequency is switched into start oscillator 43. Opening switch 36 also generates a pulse to trigger the reset circuit 49, thereby resetting the gate control 50 to the "0" state; resetting counter 63 to its initial condition; and causing sweep generator 51 to recycle. Thereafter the synthesizer proceeds to tune, as in the transmit mode.

If the synthesizer is in a stable, tuned state, either in the transmit or receive mode, and the setting of control 60 is changed to a different frequency, the synthesizer will be caused to retune to the newly selected frequency. If the changes in the frequency selected are tens, units or tenths mHz., comparator 62 will determine that the logical output of translator 61 and the equivalent count stored in counter 63 are no longer "true" and provide a trigger to reset circuit 49, initiating the synthesizer tuning cycle.

If the selected frequency is changed only in the hundredths mHz digit, the comparator 61 may properly continue to indicate a "true" correspondence between the translator and counter outputs, hence synthesizer retuning may not be initiated in the manner just described. To prevent this occurrence, a trigger pulse for reset circuit 49 is derived from one of the hundredths mHz control wires of tuning control 60 which causes a complete recycling of the synthesizer tuning.

Frequency modulation is readily accomplished in this system simply by adding the modulating audio signal, of proper amplitude to produce the desired modulation index, to the inputs to amplifier 52. The VCO 41 reacts to the audio signal in the same manner as to either of the other frequency control signals from sweep generator 51 or phase detector 66. The result is that the VCO frequency deviates at a rate determined by the audio amplitude to produce a frequency modulated carrier output from the synthesizer. This output is then amplified in amplifiers 12, 13 and 14 radiated without further processing.

The translator 61, comparator 62 and counter 63 are detailed in FIGS. 3A, 3B and 3C respectively. Assembly of these drawings in the indicated order is recommended. In the following description use will be made of Boolean algebra. The mathematical symbols employed are conventional. They are, however, defined in table I, below:

Table I

| Symbol | |
|---|---|
| A' | NOT A; Complement of A |
| AB A·B A×B | A AND B |
| A+B | A OR B |
| (A)(B+C) | A AND B OR A AND C |
| (AB)'=A'+B' | DeMorgan's Theorem; The complement of A AND B is identical to the complement of A OR the complement of B. |

The ARINC 2×5 code promulgated for standard use by commercial airlines prescribes the order of selection of pairs of wires from a group of five wires to define any decimal digit. The five wires are identified as A, B, C, D, and E each of which is energized by a positive voltage. The wires are connected to a suitable switch which grounds the appropriate pair of wires to define the decimal position of the switch. The ARINC 2×5 code, as stated for positive logic, appears in Table II below:

Table II

| ARINC 2×5 code | | | |
|---|---|---|---|
| 0=B'E' | 5=C'D' | 0=ACD | 5=ABE |
| 1=A'B' | 6=C'E' | 1=CDE | 6=ABD |
| 2=A'C' | 7=D'E' | 2=BDE | 7=ABC |
| 3=B'C' | 8=A'D' | 3=ADE | 8=BCE |
| 4=B'D' | 9=A'E' | 4=ACE | 9=BCD |

The code states that the digit 1, for example, is indicated by grounding wires A AND B. The voltage levels on these wires becomes zero, while the voltage level on each of the remaining wires C AND D AND E is at a positive value. If A AND B are grounded or at zero level, the remaining wires CDE of the group must be at a positive level. Consequently Table II contains two corollary sets, either of which uniquely defines the digits 0–9.

Referring to FIGS. 3A, B and C and particularly to FIG. 3A, five wires A–E, shown as the group 100, connect the tenths mHz. selector switch of control 60 with the logic circuits of FIG. 3A. Each of the wires is energized by a positive voltage source, not shown, and is grounded by the selector switch of control 60 in accordance with the code of table II. Similarly, five wires A–E in the group 101 connect the units mHz. selector switch, and four wires A–D in the group 102 connect the tens mHz. selector switch with the logic circuits. Since the tuning band of the system is from 116–152 mHz., only the digits 1–5 are required for the tens mHz. frequency selector. Table II shows that the complements of A, B, C, and D are sufficient to define these digits.

TENTHS mHz. LOGIC

The symbols of FIG. 3A are for NAND logic gates which provide at their output the complement of the AND function of all inputs. Gates with single inputs function as inverters providing the complement of the input at the output. Wire B of group 100 is complemented in gate 105 providing B′ at the output. Wires C–E are respectively complemented in gates 106–108. Wire A is complemented in gate 109. The complement of A AND E appears at the output of gate 110. Similarly the outputs of gates 111, 112, 113 and 114 are respectively (AB)′; (BC)′; (CD)′ and (DE)′. (The notation states that the output of gate 111 is the complement of A AND B, etc.)

The connection of the outputs of two or more gates to a common line provides the AND function of those outputs on the common line. The outputs of gates 105 and 110 are connected to a common line 116 to provide the function B′·(AE)′ on the common line. Since, by DeMorgan's theorem, (AE)′=A′+E′, the function B′·(AE)′ is equal to A′B′+B′E′. (The complement of A AND the complement of B OR the complement of B AND the complement of E). Reference to table II shows that the function B′·(AE)′=A′B′+B′E′ is "true" if the selected digit is either 1 or 0. Therefore, if the tenths mHz. selector switch is in the 0 or 1 position, a positive voltage will appear on line 116. The interconnections of gates 105–114, the functions thereby provided and the code equivalents are summarized in Table III below:

TABLE III

| Line | Gates | TENTHS mHz. Function | Code Equivalent |
|---|---|---|---|
| 116 | 105 & 110 | B′·(AE)′=A′B′+B′E′ | 0 OR .1 |
| 117 | 106 & 111 | C′·(AB)′=A′C′+B′C′ | .2 OR .3 |
| 118 | 107 & 112 | D′·(BC)′=B′D′+C′D′ | .4 OR .5 |
| 119 | 108 & 113 | E′·(CD)′=C′E′+D′E′ | .6 OR .7 |
| 120 | 109 & 114 | A′·(DE)′=A′D′+A′E′ | .8 OR .9 |

The function on each of the lines 116–120 includes an odd and an even digit and each function covers a span of 0.2 mHz. on the frequency selector. Since, as described with reference to FIG. 2, the counter 63 recognizes only the 0.2 mHz. spaced frequency components from spectrum generator 54, the logic of Table III is adequate for the control of gate 64. It is not, however, adequate for tuning to the desired 25 kHz. channel spacing. It is necessary to provide an odd, X; even, Y; logic function for the operation of frequency selector 68. The following table IV summarizes the circuits providing such functions.

TABLE IV

| Gate | Input | Output | Code Equivalent |
|---|---|---|---|
| 121 | CDE | (CDE)′ | NOT .1 |
| 122 | ADE | (ADE)′ | NOT .3 |
| 123 | ABE | (ABE)′ | NOT .5 |
| 124 | ABC | (ABC)′ | NOT .7 |
| 125 | BCD | (BCD)′ | NOT .9 |

The AND function of the outputs of gates 121–125 is provided by connection to the common line 126. A positive voltage appears on line 126 if the logical statement NOT .1 and NOT .3 and NOT .5 and NOT .7 and NOT .9 is true. The statement will be true if the tenths mHz. selector is set to an even number, consequently line 126 contains the even function Y. Since the logical complement of "any even number" is "any odd number," the odd function X is readily obtained on line 127 by inverting the Y function in gate 128.

UNITS mHz. LOGIC

The units mHz. logic is developed in the same manner as the tenths mHz. logic. The complements of the wires B, C, D, E, and A of the group 101 are respectively provided at the outputs of gates 130–134. The complements of EA, AB, BC, CD, and DE respectively appear at the outputs of gates 135–139. The order of connection of the outputs of gates 130–139 and the logic functions provided on common lines 140–144 are indicated in the following Table V:

TABLE V

| Line | Gates | UNITS mHz.) Function | Code Equivalent |
|---|---|---|---|
| 140 | 130 & 135 | B′·(AE)′=A′B′+B′E′ | 0 OR 1 |
| 141 | 131 & 136 | C′·(AB)′=A′C′+B′C′ | 2 OR 3 |
| 142 | 132 & 137 | D′·(BC)′=B′D′+C′D′ | 4 OR 5 |
| 143 | 133 & 138 | E′·(CD)′=C′E′+D′E′ | 6 OR 7 |
| 144 | 134 & 139 | A′·(DE)′=A′D′+A′E′ | 8 OR 9 |

As in the tenths mHz. logic, the units mHz. logic functions each include an odd and an even digit. An odd, Δ; and an even Γ;function are developed in gates 145–150. Gates 145–149 respectively receive as inputs (CDE), (ADE), (ABE), (ABC), and (BCD). The AND function of the complements of these inputs appears on the common line 151. This function is the even function Γ, since Γ=(CDE)′·(ADE)′·(ABE)′·(ABC)′·(BCD)′
=NOT 1 and NOT 3 and NOT 5 and NOT 7 and NOT 9.

Since Γ is true for *not* any odd digit, it is true for any even digit. The odd function, Δ, is obtained on line 152 by inverting Γ in gate 150.

TENS mHz. LOGIC

Only the wires A–D of group 102 are needed to cover the range of digits for tens mHz. frequency selection. Separate complements of wire A are provided by gates 155 and 156. Separate complements of wires B, C and D are respectively provided by gates 157, 158 and 159; 160, 161 and 162; and 163 and 164. The order of connection of the outputs of these gates and the logic functions available on the common output lines 163–167 is given in the Table VI below:

TABLE VI

| Line | TENS mHz. Gates | Function | Code Equivalent |
|---|---|---|---|
| 165 | 155 & 157 | A′B′ | 10 |
| 166 | 156 & 160 | A′C′ | 20 |
| 167 | 158 & 161 | B′C′ | 30 |
| 168 | 159 & 163 | B′D′ | 40 |
| 169 | 162 & 164 | C′D′ | 50 |

The logic output from the tens, units and tenths mHz. sections of the translator 61 are tested against a predetermined state of counter 63 in the comparators 62. When the comparator detects that a "true" condition exists for all digits of the frequency selector, i.e., for the selected tens, units and tenths mHz. digits, an enabling signal is given to gate 64, permitting sweep generator 51 to switch to slow sweep. The operation of comparator 62 will best be understood following a description of counter 63. Reference is now made to FIG. 3C.

COUNTER

The counter 63 comprises 10 J–K flip-flops, pairs of which are constructed as integrated circuit modules 175–179. The terminal connections, numbered about the module periphery as 1–14, are identical for modules 175, 177 and 179. Terminal connections for modules 176 and 178 are identical. The functions of the terminals for both types of modules are summarized below:

| Terminal | Modules 175, 177 & 179 Function | Modules 176 & 178 Function |
|---|---|---|

| | | |
|---|---|---|
| 1 | Common clock input Flip-flops No. 1 & No. 2 | Clock input Flip-flop No. 1 |
| 2 | K input; Flip-flop No. 1 | same |
| 3 | J input; Flip-flop No. 1 | same |
| 4 | Set Flip-flop No. 1 to positive "1" output | same |
| 5 | "0" output; Flip-flop No. 1 | same |
| 6 | "1" output; Flip-flop No. 1 | same |
| 7 | ground | same |
| 8 | "1" output; Flip-flop No. 2 | same |
| 9 | "0" output; Flip-flop No. 2 | same |
| 10 | Set Flip-flop No. 2 to positive "1" output | same |
| 11 | J input; Flip-flop No. 2 | same |
| 12 | K input; Flip-flop No. 2 | same |
| 13 | Reset Flip-flops No. 1 & 2 to positive "0" output | Clock input; Flip-flop No. 2 |
| 14 | B+ | same |

J–K flip-flops differ from conventional binary flip-flops in that the action of the input clock pulse does not necessarily cause the output to complement. Instead the action depends upon the state of the inputs to the J and K gates and the state of the flip-flop at the time of the appearance of the clock pulse.

The operation of J–K flip-flops may be summarized as follows:

| Input | Previous state of flip-flop (refers to output on terminal 6 or 8) | Action of clock pulse |
|---|---|---|
| J=1;K=0 | 0 | Output becomes 1 |
| J=1;K=0 | 1 | No change |
| J=1;K=1 | 0 or 1 | Complements |
| J=0;K=0 | 0 or 1 | No change |
| J=0;K=1 | 0 or 1 | Output remains 0 or becomes 0 |

"1" in the foregoing indicates the presence of a positive voltage level and "0" indicates zero or a negative voltage level.

Flip-flops M and N of module 175 and P of module 176, the outputs of which are respectively designated M, M'; N, N'; and P, P' are interconnected with the outputs M and M' going to the J and K inputs of flip-flop N; the N and N' outputs of flip-flop N going to the J and K inputs of flip-flop P; the P' output going to the J input of flip-flop M and the N output flip-flop N going to the K input of flip-flop M. Negative clock pulses from detector and pulse shaper 47 (FIG. 2) appear on line 181. A negative pulse from reset circuit 49 appears on line 182 prior to the beginning of any counting cycle to set the initial condition of the counter to M', N', P. In other words, initially the M, N and P' outputs of the flip-flops are at zero output level while the M', N' and P outputs are at a positive level. The interconnections of flip-flops M, N and P provide a counter with an output pattern which is cyclically repetitive on counts of five clock pulses. The operation of counter MNP and following counter stages will later be explained with reference to the truth tables of FIGS. 4 and 5.

An output for succeeding counter stages is taken from the M' output of flip-flop M. This output is applied on line 183 to the clock input terminal of flip-flop Q in module 176. The clock input requires a negative going pulse, consequently an effective transfer to flip-flop Q occurs only upon the transition of M' from a "1" to a "0" state.

The J and K inputs to flip-flop Q are open, which is equivalent to a "1" level at both inputs. Each negative pulse on line 183 therefore causes flip-flop Q to complement. Transition of output Q from "1" to "0" generates a negative pulse on line 184 which is used as the clock input to flip-flops R and S of module 177 and flip-flop T of module 178.

Flip-flops R, S and T are interconnected with the R and R' outputs of flip-flop R respectively connected to the J and K inputs of flip-flop S; the S and S' outputs of flip-flop S respectively connected to the J and K inputs of flip-flop T; and with the T output connected to the K input and the S' output connected to the J input of flip-flop R. The connections of flip-flops R, S and T to the reset line 182 produce the initial condition R', S' and T. That is, upon reset the "0" outputs of flip-flops R and S and the "1" output of flip-flop T are positive. The T' output is connected as the clock input to the succeeding counter stage comprising flip-flop U of module 178 and flip-flops V and W of module 179. The connections and initial conditions of flip-flops R, S and T provides such clock pulses to the succeeding stages upon reception of the third, eighth, and thirteenth input clock pulses from flip-flop Q.

The U and U' output of flip-flop U are respectively connected to the J and K inputs of flip-flop V. The V and V' outputs are connected to the J and K inputs of flip-flop V. The W' and W outputs are connected respectively to the J and K inputs of flip-flop U. The latter connections are inverted to the order of input connections to flip-flops V and W. The U, V and W outputs are positive upon reset.

FIG. 4 contains a truth table helpful in explaining the operation of the counter comprised by flip-flops M, N and P. When the counter is reset, flip-flop outputs M and N are 0 and output P is 1. This establishes the input levels to the J and K inputs of the flip-flops prior to the appearance of the first clock pulse. Since P=1, P'=0. The initial J and K inputs to flip-flop M are 0 and 0. Since M and N are 0, M' and N' are 1. The J and K inputs to flip-flops N and P are therefore 0, 1 and 0, 1. The states of these initial inputs appear in the respective J and K columns in the row of clock pulse 1. When the first clock pulse appears the reaction of the flip-flops depends upon the J–K input states existing at the moment. In accordance with the rules given above, the first clock pulse will produce the following results:

J and K for flip-flop M are both 0; result—no change.

J and K for flip-flop N are 0 and 1; result—no change.

J and K for flip-flop P are 0 and 1; result—P=0.

The state of the flip-flops at the end of the first clock pulse are shown in the row of clock pulse 1 as 0, 0, 0. Again, these states determine the J–K states at the time of the appearance of clock pulse 2, which are shown in the row of clock pulse 2 as 1, 0; 0, 1; and 0, 1. The result of clock pulse 2 is to shift the counter into the state 1, 0, 0. Clock pulses 3, 4 and 5 shift the counter to 1, 1, 0; 0, 1, 1; and 0, 0, 1. At the end of clock pulse 5, the counter has returned to the initial, reset condition. Five clock pulses drive the counter through a complete cycle, so the counter state after any number of clock pulses will be repeated upon the appearance of five additional clock pulses. For example, the same counter states appear for clock pulses 2, 7, 12, etc.

Adjacent column P is column M'. The values in this column differ from those in the K column of flip-flop N, since the later column is the value of M' prior to the appearance of a given clock pulse, while column M' is the value after the occurrence of a particular pulse, corresponding throughout to the complements of the values appearing in column M.

The clock pulse input to flip-flop Q is a negative pulse derived from transition of M' from a positive, 1, level to a negative, 0, level. The asterisks adjacent column M' denote the generation of such pulses. These occur immediately after clock pulse numbers 2, 7, 12, 17, etc., to counter M, N, P, the latter clock pulses being derived from the detector and pulse shaper 47 of FIG. 2.

Tables similar to FIG. 4 can be constructed to explain in detail the operation of the counters comprised by flip-flops R, S, T and U, V, W. These counters are sufficiently alike to counter MNP, however, that the summary truth table of FIG. 5 should be adequate for explanation. The values of M, N, and P, corresponding to those of FIG. 4, appear in the left most group of columns. In an adjacent group of columns M', N' and P' the complementary values of M, N, and P are shown. The values of M, N, and P are given for limited sequence of clock pulses commencing at reset and ending at clock pulse No. 22. It will be understood that the table may be extended as far as may be desired simply by writing the same values for clock pulse No. 23 as are given for clock pulse No. 18, the same for clock pulse No. 24, as are given for clock pulse No. 19, etc.

A clock pulse for flip-flop Q is generated upon each transition of M' from 1 to 0. These events are marked in the M' column by asterisks. The state of the outputs Q and Q′ of flip-flop Q are given for a sequence of 17 clock pulses derived from M′. These pulses are identified adjacent column Q to correspond with the number clock pulses supplied to counter MNP necessary to produce each change in state of flip-flop Q. Although the table extends only to an accumulated clock pulse count of 82, the table may be continued as desired by increasing the accumulated count by 5 for each entry. Clock pulses to counter RST are provided by the transition of the Q output of flip-flop Q from 1 to 0. The generation of each such pulse is marked by the asterisks in column Q.

Columns RST and R′S′T′ show the states of the counter comprised by flip-flops RST for a sequence of flip-flop 17 clock pulses from flip-flo Q, following reset. As is apparent from column Q, such pulses are generated after the second, 12th, 22nd, etc., clock pulses are applied to counter MNP. Counter RST, like counter MNP, completes one cycle for each five input clock pulses. Although both counters are reset to the same initial condition, the different input connections to flip-flops M and R cause the counters to follow a different order of states as the clock count progresses. Obviously, the tables for counter RST may be extended by repeating the values given in the fifth row preceding the new entry. Clock pulses for counter UVW are provided by the transition of T′ from 1 to 0. The asterisks in the T′ column mark such events for accumulated clock counts of 22, 72 and 122. Although it does not appear in the table, obviously clock pulses for counter UVW will also be generated for accumulated counts of 172, 222 and 272. The tables for counter UVW extend only to an accumulated count of 272, which is adequate to cover the tuning range of the system.

It will be recalled from the description of FIG. 2 that the first clock pulse to counter 63 occurs when the frequency of oscillator 41 has been swept to 115.6 mHz. Thereafter additional clock pulses appear for each 0.2 mHz. increase in frequency. Following reset, each pulse drives counter 63 into a unique state. Comparator 62, now to be described with reference to FIG. 3B, compares the state of counter 63 with the output of translator 61 to determine the point at which the frequency of oscillator 41 has been swept to within 0.2 mHz. of the desired frequency and thereupon terminates the fast sweep.

TENTHS mHz. COMPARATOR

The statements from the tenths logic circuits of translator 61, summarized above in table III are conducted by lines 116–120 respectively to NAND-gates 190–194. The statement on line 116 is combined in gate 190 with the M output on line 196 and the N′ output on line 197 from counter MNP. Similarly, the statement on line 117 is combined in gate 191 with M and N on lines 196 and 198; gate 192 combines the statement on line 118 with N and P on lines 198 and 199; gate 193 combines the statement on line 199 with N′ and P on lines 197 and 199; and gate 194 combines the statement on 120 with M′ and P′ on lines 200 and 201. From the truth table of FIG. 5 it will be seen that MN′ is true for clock counts of 2, 7, 12, etc.; MN is true for counts of 3, 8, 13, etc.; NP is true for counts of 4, 9, 14, etc.; N′P is true for counts of 0, 5, 10, etc.; and that M′P′ is true for counts of 1, 6, 11, etc. The AND functions of the outputs of gates 190–194 is provided by connecting their outputs to the common line 202.

The function on line 202 is:

$$\{MN'(A'B'+B'E')\}' \cdot \{MN(A'C'+B'C')\}' \cdot \{NP(B'D'+C'D')\}' \cdot \{N'P(C'E'+D'E')\}' \cdot \{P'M'(A'D'+A'E')\}'$$

By inverting the function on line 202 in gate 203, in accordance with deMorgan's theorem, the OR function of the complements of each of the terms of the above expression is obtained. Substituting from table IV the code equivalent of the terms (A′B′+B′E′) etc., the output of gate 203 can be written as:

$$\{MN'(0+.1)\}+\{MN(.2+.3)\}+\{NP(.4+.5)\}+\{N'P(.6+.7)\}+\{P'M'(.8+.9)\}$$

Thus, the function of line 202 is true if the tenths mHz. frequency selector is set to 0 or 0.1 AND the counter has accumulated 2 or 7 or 9 counts OR if the frequency selector is set to 0.2 or 0.3 AND the counter has accumulated 3 or 8 or 13 counts OR if any of the remaining bracketed statements are true.

UNITS mHz. COMPARATOR

The logic statements on lines 140–144 of translator 61 are applied respectively to NAND-gates 204–208. The inputs to gates 204–208 include connections from counter RST as follows: gate 204, R on line 209, T on line 210; gate 205, R′ on line 211, S on line 212; gate 206, R′ on line 211, S′ on line 213; gate 207, S′ on line 213, T′ on line 214; gate 208, S on line 212, T′ on line 214. The AND function of gates 204–208 is provided by connecting their outputs to a common line 215.

From table V and the connections just described the function on line 215 is:

$$\{RT(A'B'+B'E')\}' \cdot \{R'S(A'C'+B'C')\}' \cdot \{R'S'(B'D'+C'D')\}' \cdot \{S'T'(C'E'+D'E')\}' \cdot \{ST'(A'D'+A'E')\}'$$

Inverting the function on line 215 in gate 220 and substituting the code equivalents for the terms (A′B′+B′E′) etc., the output of gate 220 becomes:

$$\{RT(0+1)\}+\{R'S(2+3)\}+\{R'S'(4+5)\}+\{S'T'(6+7)\}+\{ST'(8+9)\}$$

Referring to the truth tables of FIG. 5 for counter RST, the output of gate 220 will be true if the units mHz. frequency selector is set to 0 or 1 and the clock count is 22 or 72 or 122 OR if the frequency selector is set to 2 or 3 and the clock count is 32 or 82 or 132 OR if the frequency selector is set to 4 or 5 and the clock count is zero or 42 or 72 OR if any of the remaining bracketed terms are true.

Since each of the bracketed terms may be true for a frequency selection which is either an odd or an even number, the even function Γ on line 151 is compared with Q′ on line 216 in NAND-gate 217. The odd function Δ on line 152 is compared with Q on line 184 in NAND-gate 218. The connection of the outputs of gates 217 and 218 provides on the common line 219 the function $$\{\Gamma \cdot Q'\}' \cdot \{\Delta \cdot Q\}'$$

This expression is inverted in gate 235 to provide at its output:

$$\{\Gamma \cdot Q'\}+\{\Delta \cdot Q\}$$

This statement will be true if the units mHz. frequency selector is set to an even number and the pulse count is 2 or 12 or 22, etc. OR if the units frequency selector is set to an odd number and the pulse count is 0 or 7 or 17, etc.

TENS mHz. COMPARATOR

The statements from the tens mHz. logic of translator 61 appearing on lines 165–169 are compared with the state of counter UVW in NAND-gates 221–225. The counter connections are as follows: gate 221, U on line 226, W on line 227; gate 222, U′ on line 228, V on line 229, gate 223, W on line 227, V′ on line 230; gate 224, U′ on line 228, W′ on line 231; gate 225, U on line 226, W′ on line 231. The AND function of the outputs of gates 221–225 is provided on the common output line 232. From Table VI, it will be seen that this function may be written as $$\{UW(10)\}' \cdot \{U'V(20)\}' \cdot \{WV'(30)\}' \cdot \{U'W'(40)\}' \cdot \{UW(50)\}'$$

The number in parentheses in each of the above terms is the setting of the tens mHz. frequency selector. Inversion of the function on line 232 in gate 233 provides:

$$\{UW(10)\} + \{U'V(20)\} + \{WV'(30)\} + \{U'W'(40)\} + \{UW(50)\}$$

which is true if any of the bracketed terms is true. For example, the output of gate 233 is true if the frequency selector is set at 20 mHz. and the clock count is equal to at least 22 but is less than 72.

Connection of the outputs of gates 203, 220, 233 and 235 to a common line provides the AND function of those outputs. The function on line 236 is:

$$[\{MN'(0+.1)\} + \{MN(.2+.3)\} + \{NP(.4+.5)\} + \{N'P(.6+.7)\} + \{M'P'(.8+.9)\}] \quad \text{(TENTHS mHz)}$$

AND $$[\{RT(0+1)\} + \{R'S(2+3)\} + \{R'S'(4+5)\} + \{S'T'(6+7)\} + \{ST'(8+9)\}] \quad \text{(UNITS mHz)}$$

AND $$[\{\Gamma \cdot Q'\} + \{\Delta \cdot Q\}]$$

AND $$[\{UW(10)\} + \{U'V(20)\} + \{WV'(30)\} + \{U'W'(40)\} + \{UW(50)\}] \quad \text{(TENS mHz).}$$

When the sweep generator 51 has swept the frequency of oscillator 41 (FIG. 2) to within 0.2 kHz. or 0.3 kHz. of the frequency selected on control 60, the function on line 236, written above, becomes true. The voltage level on this line is then positive. Since the circuit details of sweep generator 51 in this particular embodiment render it more convenient to switch the sweep generator output from fast to slow with a negative or zero level output from the comparator 62, the output on line 236 is inverted in gate 237 prior to application to the sweep generator.

OPERATION

One embodiment of the invention is capable of tuning through a range of 116.000 to 151.975 mHz. in 25 kHz. steps. The counter 63 and comparator 62 function, together with the translator 61 to switch the output of the sweep generator from fast to slow and to enable gate 64. The translator provides additional outputs for determining whether a low frequency bank of crystals covering the four channels from 0.000 to 0.075 mHz. or a high-frequency bank of crystals covering the four channels from 0.100 to 0.175 mHz. will be selected for crystal oscillator 67.

Suppose it is desired to tune the lowest operating frequency of 116.000 mHz. The tens mHz. selector is set to 10, the units mHz. to 6 and the tenths mHz. to 0. The frequency of the start oscillator 43 in the transmit mode is 119.6 mHz. Referring to the output on line 236, as written above, it will be seen that the statement is true when the following condition of the counter is true: MN' AND S'T' AND Q' AND UW. From FIG. 5, MN' is true for clock counts of 2, 7, 12, etc.; S'T' is true for clock counts of 2, 52, 102, etc.; Q' is true for counts of 2, 12, 22, etc., and UW is true for all counts less than 22. The lowest clock count satisfying all of the terms of the statement on line 236 causes the output of sweep generator 51 to switch from fast to slow. Therefore the sweep rate will be switched at a count of 2. The first clock pulse appears when the VCO frequency reaches 115.6 mHz. and the second clock pulse appears at 115.8 mHz. at which point the switchover in sweep rate occurs and gate 64 is enabled to permit pull-in and phase lock of the VCO.

As a second example, suppose 137.550 mHz. is to be tuned. The CD outputs of frequency selector 60 and the XY outputs of translator 61 cause frequency selector 68 to connect a crystal having a frequency of 3.850 mHz. to oscillator 67. In the preceding example, the frequency of oscillator 67 is 4.000 mHz. The logic statement requires the following counter states to be true for a true output on line 236: NP AND S'T' AND Q AND WV'. NP is true for counts of 4, 9, 14, etc. S'T' is true for counts of 52, but less than 62; 102, but less than 112, etc. Q is true for counts of 7, but less than 12; 17 but less than 22, etc. WV' is true for counts of 72 but less than 122. Within this range NP is true for counts of 104 and 109 and Q is true for a count of at least 107 but less than 112. Therefore, the sweep must continue at a fast rate until 109 clock pulses are counted. Since the first clock pulse occurs when the VCO frequency reaches 115.75 mHz. and additional clock pulses occur at 0.2 mHz. intervals a count of 109 will be reached when the VCO frequency equals 137.35 mHz. At that point, sweep generator 51 is switched from fast to slow and the VCO frequency continues to increase, but at a slower rate, until phase lock occurs at 137.550 mHz.

Tuning in the receive mode occurs in an identical manner except that the start oscillator frequency is 103.4 mHz. Consequently the first clock pulse appears when the VCO frequency is swept to 99.55 mHz. When the VCO frequency passes 121.0 mHz. 108 additional clock pulses will have appeared causing switchover in the sweep rate. The clock pulse occurring at switchover is generated by the 121.150 mHz. signal from the VCO beating against the 125.0 mHz. component from spectrum generator 54. The slow sweep forces the VCO frequency to increase, until the difference between the 125.2 mHz. component from the spectrum generator and the VCO frequency equals 3.850 mHz. The VCO frequency will then be 121.350 mHz., which is the proper frequency to produce a 16.2 mHz. intermediate frequency from a received signal frequency of 137.500 mHz.

Obviously many modifications and variations are possible in the light of the above teachings. It is therefore to be understood that the invention may be practiced otherwise than as specifically disclosed within the scope of the appended claims.

The invention claimed is:

1. A remotely controlled superheterodyne radio transceiver tunable to a selected channel of limited bandwidth from amongst a plurality of such channels within an operating band of frequencies, comprising

- a stable oscillator,
- means for generating a spectrum of harmonics of the output frequency of said stable oscillator, said spectrum extending throughout the band of frequencies to be tuned by said transceiver, each harmonic component of said spectrum being separated in frequency from its adjacent components by an amount equal to a plurality of channel bandwidths,
- a variable-frequency voltage-controlled oscillator,
- sweep means for generating a varying control voltage to vary the frequency of said voltage-controlled oscillator,
- means for mixing the output of said voltage-controlled oscillator with the output of said harmonic generator to produce a difference frequency signal,
- means for converting said difference frequency signal into a pulse whenever the frequency thereof equals a predetermined value,
- means for counting the number of said pulses produced by sweeping said voltage-controlled oscillator, each succeeding one of said pulses being produced as the difference between the frequency of said voltage controlled oscillator and successive harmonic components attains said predetermined value,
- a remote digital control switch,
- logic means for presetting said counting means to a number determined by said control switch, a plurality of fixed frequency oscillators having frequencies differing from one another by an amount substantially equal to the channel bandwidth of said radio, second logic means controlled by said remote control switch for selecting one of said fixed frequency oscillators according to the channel upon which said radio is to operate, phase lock frequency control means for comparing the phase of the output of said mixing means with the phase of the output of said selected oscillator and producing an output corresponding to the difference between said phases, means controlling said counting means so as to commence counting pulses when the frequency of said voltage-controlled oscillator is at a known value, means controlled by said counting means for arresting said sweep means and for switching the control voltage of said voltage-controlled oscillator to the output of said phase lock means whenever said preset number of said counter is reached, means for modulating and radiating the output of said voltage-controlled oscillator as the transmitter signal of said transceiver, and means for utilizing the output of said voltage-controlled oscillator as a local oscillator signal during reception by said transceiver.

2. A radio transceiver as claimed in claim 1 wherein said means controlling said counter to commence counting at a known frequency of said voltage-controlled oscillator comprises a reference oscillator of known frequency and switching means operative in a first condition to substitute the output of said reference oscillator for the output of said spectrum generating means as an input to said mixing means, and to inhibit said counter; and operative in a second condition to apply the output of said spectrum generating means as an input to said mixing means while disconnecting the output of said reference oscillator therefrom, and to enable said counter; said switching means changing from said first condition to said second condition upon the appearance of a pulse from said difference frequency signal converting means.

3. A radio transceiver as claimed in claim 1 wherein said remote control switch is settable to a decimal digit and having a plurality of conductors connecting said control switch with said logic means, the number of said conductors being less than the number of decimal digits to which said control switch may be set, said control switch energizing said conductors in combinations each of which uniquely defines each decimal digit to which said control switch may be set, and wherein said logic means includes translating means for converting said combinations of conductors to a binary coded number constituting said preset number of said counter.

4. A radio transceiver as claimed in claim 1 wherein said means for arresting said sweep means comprises a detector for determining as inphase condition between output of said mixing means and output of said selected oscillator and wherein said phase lock frequency control means comprises a detector for determining quadrature phase condition between output of said mixing means and output of said selected oscillator.

5. A radio transceiver as claimed in claim 1 with additionally a voltage-controlled filter interposed between the output of said spectrum generating means and said mixing means, said filter being controlled by the control voltage applied to said voltage-controlled oscillator to provide a passband of harmonic components from said spectrum generating means which maintains a substantially constant relationship to the frequency of said voltage-controlled oscillator.

6. A radio transceiver as claimed in claim 2 with additionally means for causing the frequency of said reference oscillator to assume a first known value during transmission by said transceiver and to assume a second known value during reception by said transceiver.

7. A radio transceiver as claimed in claim 3 wherein said plurality of conductors comprise five conductors for each ten decimal digits of said switch and wherein said combinations comprise different pairs of said five wires.

8. A radio transceiver as claimed in claim 6 including switch means for selecting operation of said radio as a receiver or as a transmitter, said switch means being arranged to cause said counting means to reset to a condition for counting said preset number and to initiate action by said sweep means whenever the mode of operation of said radio is changed from receive to transmit and vice versa, said switch means also selecting the frequency of said reference oscillator according to whether the mode of operation of said radio is receive or transmit.

* * * * *